(12) United States Patent
Uefune et al.

(10) Patent No.: US 10,699,730 B1
(45) Date of Patent: Jun. 30, 2020

(54) DUAL SYMMETRICAL ACTUATOR HARD DISK DRIVE

(71) Applicant: Western Digital Technologies, Inc., Irvine, CA (US)

(72) Inventors: Kouki Uefune, Hiratsuka (JP); Toshifumi Kumano, Fujisawa (JP); Toshio Takahashi, Minatoku (JP)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 16/457,964

(22) Filed: Jun. 29, 2019

(51) Int. Cl.
*G11B 5/012* (2006.01)
*G11B 19/20* (2006.01)

(52) U.S. Cl.
CPC .......... *G11B 5/012* (2013.01); *G11B 19/2009* (2013.01)

(58) Field of Classification Search
CPC ............................. G11B 5/5578; G11B 5/4813
See application file for complete search history.

(56) References Cited

U.S. PATENT DOCUMENTS

| | | | |
|---|---|---|---|
| 4,544,972 A * | 10/1985 | Kogure | G11B 5/5521 360/246.7 |
| 5,081,552 A | 1/1992 | Glaser et al. | |
| 5,223,993 A | 6/1993 | Squires et al. | |
| 5,293,282 A * | 3/1994 | Squires | G06F 3/0601 360/77.08 |
| 5,343,345 A | 8/1994 | Gilovich | |
| 5,343,347 A | 8/1994 | Gilovich | |
| 5,761,007 A | 6/1998 | Price et al. | |
| 5,880,904 A * | 3/1999 | Mizoshita | G11B 5/54 360/97.16 |
| 6,005,743 A | 12/1999 | Price et al. | |

(Continued)

FOREIGN PATENT DOCUMENTS

WO 2016053193 4/2016

OTHER PUBLICATIONS

Zheng et al., Feedforward decoupling control design for dual-actuator system in hard disk drives, IEEE Transaction on Magnetics, Jul. 2004, Abstract only, vol. 40, Issue 4, https://ieeexplore.ieee.org/abstract/document/1325412 accessed Apr. 17, 2019.

(Continued)

*Primary Examiner* — Brian E Miller
(74) *Attorney, Agent, or Firm* — Kunzler Bean & Adamson

(57) ABSTRACT

Disclosed herein is a dual actuator magnetic storage device that comprises a housing, magnetic disks in the housing, an interface connector located proximate a first corner of the housing formed by a first short side and a first long side, a first voice coil motor proximate a second corner of the first short side and a second long side, a first carriage arm positioned near the first short side to move the first carriage arm relative to the magnetic disks, a second voice coil motor positioned proximate a second short side along the first long side, a second carriage arm positioned near the second short side and coupled to the second voice coil motor to move the second carriage arm. The interface connector is recessed into a base of the housing along the first short side to be near the first long side to provide electrical communication through the housing.

20 Claims, 7 Drawing Sheets

(56) References Cited

U.S. PATENT DOCUMENTS

| | | | | |
|---|---|---|---|---|
| 6,005,747 | A * | 12/1999 | Gilovich | G11B 5/54 360/98.07 |
| 6,057,990 | A | 5/2000 | Gilovich | |
| 6,208,489 | B1 * | 3/2001 | Marchon | G11B 5/6005 360/254 |
| 6,493,176 | B1 * | 12/2002 | Deng | G11B 5/5552 360/48 |
| 6,560,075 | B2 | 5/2003 | Price et al. | |
| 6,603,640 | B1 * | 8/2003 | Prater | F16C 19/54 360/264.4 |
| 6,690,549 | B1 * | 2/2004 | Aikawa | G11B 5/4813 360/264.4 |
| 6,735,032 | B2 * | 5/2004 | Dunn | G11B 5/59633 360/31 |
| 7,315,429 | B2 * | 1/2008 | van Zyl | G11B 5/4806 360/61 |
| 7,430,091 | B2 * | 9/2008 | Manasse | G11B 5/5578 360/75 |
| 8,611,052 | B1 * | 12/2013 | Pan | G11B 5/4846 360/264.2 |
| 8,824,094 | B1 | 9/2014 | Furlong et al. | |
| 9,142,246 | B1 * | 9/2015 | Trantham | G11B 19/048 |
| 9,361,919 | B1 * | 6/2016 | Lieu | G11B 5/556 |
| 9,911,442 | B1 | 3/2018 | Kharisov et al. | |
| 9,972,347 | B1 * | 5/2018 | Pan | G11B 5/295 |
| 10,090,017 | B2 * | 10/2018 | Gartee | G11B 21/025 |
| 10,332,555 | B1 * | 6/2019 | Keshavan | G11B 19/2018 |
| 2004/0179465 | A1 * | 9/2004 | Kuwajima | G11B 5/5521 369/300 |
| 2005/0207067 | A1 * | 9/2005 | Zabtcioglu | G11B 5/012 360/266.2 |
| 2007/0035868 | A1 | 2/2007 | Van Zyl | |
| 2009/0013342 | A1 * | 1/2009 | Gilovich | G11B 5/4813 720/695 |
| 2017/0309304 | A1 * | 10/2017 | Tan | G11B 5/5578 |
| 2018/0174613 | A1 * | 6/2018 | Zhu | G11B 5/5578 |

OTHER PUBLICATIONS

Trantham, J., LOC Designing Storage Architecture for Digital Collections, Seagate Research, Sep. 17, 2018, pp. 1-19, Seagate Technology.

* cited by examiner

DUAL SYMMETRICAL ACTUATOR HARD DISK DRIVE

FIELD

This disclosure relates generally to magnetic storage devices, and more particularly to improving the storage capacity of magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Storage capacity is limited by the area available and the areal density capability of the storage elements of the HDD.

SUMMARY

A need exists for a magnetic storage device and a method of manufacture that meets the small form factor standard and provides improved storage capacity within the dimensional constraint, as the data storage applications such as data center storage systems are extensively standardized for the small form factor HDD. The subject matter of the present application has been developed in response to the present state of magnetic storage devices, and in particular, in response to problems and needs in the art, such as those discussed above, that have not yet been fully solved by currently available magnetic storage devices. Accordingly, the embodiments of the present disclosure overcome at least some of the shortcomings of the prior art.

Disclosed herein is a dual actuator magnetic storage device that comprises a housing defining an interior cavity. The dual actuator magnetic storage device also comprises magnetic disks in the interior cavity of the housing. The dual actuator magnetic storage device also comprises an interface connector located on a first short side of the housing proximate a first corner of the housing formed by the first short side and a first long side of the housing, the first long side of the housing being perpendicular to the first short side of the housing. The dual actuator magnetic storage device also includes a first voice coil motor in the interior cavity and positioned proximate a second corner of the housing formed by the first short side and a second long side of the housing, the second long side of the housing being opposite and parallel to the first long side of the housing. The dual actuator magnetic storage device also comprises a first carriage arm in the interior cavity and positioned near the first short side of the housing, being coupled to the first voice coil motor to move the first carriage arm relative to the magnetic disks, and configured to position a first read-write head relative to the magnetic disks, wherein the read-write head is configured to read data from, and write data to, the magnetic disks. The dual actuator magnetic storage device also comprises a second voice coil motor in the interior cavity and positioned proximate a second short side of the housing and along the first long side of the housing, the second short side of the housing being opposite and parallel to the first short side of the housing. The dual actuator magnetic storage device also comprises a second carriage arm in the interior cavity and positioned near the second short side of the housing opposite and parallel to the first short side of the housing, being coupled to the second voice coil motor to move the second carriage arm relative to the magnetic disks, the second carriage arm configured to position a second read-write head relative to the magnetic disks to read data from, and write data to, the magnetic disks. The dual actuator magnetic storage device wherein the interface connector is recessed into a base of the housing along the first short side of the housing to be near the first long side of the housing, wherein the interface connector is configured to provide electrical communication through the housing. The preceding subject matter of this paragraph characterizes example 1 of the present disclosure.

The housing has an overall thickness of approximately one inch. The preceding subject matter of this paragraph characterizes example 2 of the present disclosure, wherein example 2 also includes the subject matter according to example 1, above.

The first long side and the second long side of the housing each have a length of approximately 5.75 inches and the first short side of the housing has a length of approximately 4 inches. The preceding subject matter of this paragraph characterizes example 3 of the present disclosure, wherein example 3 also includes the subject matter according to examples 1-2, above.

The magnetic disks have a diameter of between approximately 3.5 inches (88.9 mm) and approximately 4 inches (101.6 mm). The preceding subject matter of this paragraph characterizes example 4 of the present disclosure, wherein example 4 also includes the subject matter according to examples 1-3, above.

The dual actuator magnetic storage device further comprises a first feedthrough connector in the interior cavity positioned adjacent to the interface connector along the first long side of the housing and a second feedthrough connector in the interior cavity positioned along the second long side of the housing and proximate the second short side of the housing. The preceding subject matter of this paragraph characterizes example 5 of the present disclosure, wherein example 5 also includes the subject matter according to examples 1-4, above.

The dual actuator magnetic storage device further comprises a first pivot coupled to the first carriage arm and defining a first rotational axis about which the first carriage arm rotates, a first ramp support in the interior cavity and configured to receive the first carriage arm, a second pivot coupled to the second carriage arm and defining a second rotational axis about which the second carriage arm rotates, and a second ramp support in the interior cavity and configured to receive the second carriage arm. The preceding subject matter of this paragraph characterizes example 6 of the present disclosure, wherein example 6 also includes the subject matter according to examples 1-5, above.

The first voice coil motor, the first pivot, the first carriage arm, the first ramp support, and the first feedthrough connector are arranged in order along an imaginary line drawn perpendicular to the first long side and the second long side and parallel to the first short side and the second short side of the housing. The preceding subject matter of this paragraph characterizes example 7 of the present disclosure, wherein example 7 also includes the subject matter according to examples 1-6, above.

The magnetic disks comprise equal to or more than ten magnetic disks. The preceding subject matter of this paragraph characterizes example 8 of the present disclosure, wherein example 8 also includes the subject matter according to examples 1-7, above.

One of the first read-write head and the second read-write head is oriented in a downward facing arrangement relative to a corresponding one of the magnetic disks and the other of first read-write head and the second read-write head is oriented in an upward facing arrangement relative to the corresponding one of the magnetic disks, wherein the downward facing arrangement and the upward facing arrangement orient the read-write heads in opposite directions relative to one another. The preceding subject matter of this paragraph characterizes example 9 of the present disclosure, wherein example 9 also includes the subject matter according to examples 1-8, above.

At least one of the first read-write head has a downward facing arrangement and another at least one of the first read-write head has an upward facing arrangement, wherein the downward facing arrangement and the upward facing arrangement orient the read-write heads in opposite directions relative to one another. The preceding subject matter of this paragraph characterizes example 10 of the present disclosure, wherein example 10 also includes the subject matter according to examples 1-9, above.

The first carriage arm comprises a single one of the first read-write head. The preceding subject matter of this paragraph characterizes example 11 of the present disclosure, wherein example 11 also includes the subject matter according to examples 1-10, above.

At least one of the first read-write head and the second read-write head comprises an energy-assisted magnetic recording head. The preceding subject matter of this paragraph characterizes example 12 of the present disclosure, wherein example 12 also includes the subject matter according to examples 1-11, above.

Further disclosed herein is a dual actuator magnetic storage device that comprises a housing defining an interior cavity. The dual actuator magnetic storage device further comprises a magnetic disk in the interior cavity of the housing. The dual actuator magnetic storage device further comprises a first actuator assembly positioned along a first short side of the housing and within the interior cavity to move relative to the magnetic disk. The first actuator assembly comprises a first feedthrough connector positioned along the first short side of the housing to be proximate a first long side of the housing, the first long side being perpendicular to the first short side and forming a first corner in the housing and a first voice coil motor electrically coupled to the first feedthrough connector and positioned along the first short side of the housing to be proximate a second long side of the housing parallel to and opposite the first long side of the housing and forming a second corner in the housing. The dual actuator magnetic storage device further comprises a second actuator assembly positioned along a second short side of the housing and within the interior cavity to move relative to the magnetic disk, wherein the second short side of the housing is opposite the first short side. The second actuator assembly comprises a second feedthrough connector positioned proximate the second short side of the housing and along the second long side of the housing and a second voice coil motor electrically coupled to the second feedthrough connector and positioned proximate the second short side of the housing and along the first long side of the housing. The preceding subject matter of this paragraph characterizes example 13 of the present disclosure.

The dual actuator magnetic storage device further comprises an interface connector coupled to the housing on the first short side of the housing proximate the first long side of the housing. The preceding subject matter of this paragraph characterizes example 14 of the present disclosure, wherein example 14 also includes the subject matter according to example 13, above.

The first actuator assembly further comprises a first pivot coupled to the first voice coil motor, wherein the first voice coil motor is positioned along the first short side to be between the first pivot and the second long side of the housing, a first carriage arm coupled to and extending from the first pivot with the first pivot defining a rotational axis about which the first carriage arm rotates, and a first ramp support positioned along the first short side to receive and support the first carriage arm in a standby state, wherein the first carriage arm is positioned primarily between the first pivot and the first ramp support in the standby state, and the first ramp support is positioned between the first carriage arm and the first feedthrough connector. The preceding subject matter of this paragraph characterizes example 15 of the present disclosure, wherein example 15 also includes the subject matter according to examples 13-14, above.

The first actuator assembly and the second actuator assembly are positioned opposite one another within the housing, with the magnetic disk positioned between the first actuator assembly and the second actuator assembly to have a symmetrical arrangement relative to the magnetic disk. The preceding subject matter of this paragraph characterizes example 16 of the present disclosure, wherein example 16 also includes the subject matter according to examples 13-15, above.

Also disclosed herein is a method of making a dual actuator magnetic storage device. The method comprises forming a housing to define an interior cavity. The method also comprises positioning a magnetic disk in the interior cavity. The method also comprises locating an interface connector in a first short side of the housing proximate a first corner of the housing formed by the first short side of the housing and a first long side of the housing. The method also comprises arranging a first voice coil motor along the first short side of the housing to be proximate a second corner of the housing formed by the first short side and a second long side of the housing, the second long side being opposite and parallel to the first long side of the housing. The method also comprises installing a first feedthrough connector to be proximate the first corner of the housing with the interface connector positioned between the first feedthrough connector and the first short side of the housing. The method also comprises arranging a second voice coil motor and a second feedthrough connector, symmetrical to the first voice coil motor and the first feedthrough connector, along a second short side of the housing opposite the first short side of the housing. The preceding subject matter of this paragraph characterizes example 17 of the present disclosure.

Locating the interface connector in the first short side of the housing comprises recessing the interface connector in the first short side of the housing. The preceding subject matter of this paragraph characterizes example 18 of the present disclosure, wherein example 18 also includes the subject matter according to example 17, above.

The housing is approximately rectangular having 1 inch in thickness with the first short side and second short side each measuring approximately 4 inches, the first long side and second long side each measuring 5.75 inches, and the magnetic disk measuring between approximately 3.5 inches (88.9 mm) and approximately 4 inches (101.6 mm). The preceding subject matter of this paragraph characterizes example 19 of the present disclosure, wherein example 19 also includes the subject matter according to examples 17 and 18, above.

The method further comprises aligning the first voice coil motor and the first feedthrough connector along a first imaginary line drawn perpendicular to the first long side and the second long side and parallel and proximate to the first short side of the housing, and aligning the second voice coil motor and the second feedthrough connector along a second imaginary line drawn perpendicular to the first long side and the second long side and parallel and proximate to the second short side of the housing. The preceding subject matter of this paragraph characterizes example 20 of the present disclosure, wherein example 20 also includes the subject matter according to examples 17-19, above.

The dual actuator magnetic storage device further comprises a spindle motor coupled to the magnetic disks and configured to rotate the magnetic disks in a direction such that a point on a surface of the magnetic disk moves along the first carriage arm towards the first read-write head. The preceding subject matter of this paragraph characterizes example 21 of the present disclosure, wherein example 21 also includes the subject matter according to examples 1-12, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
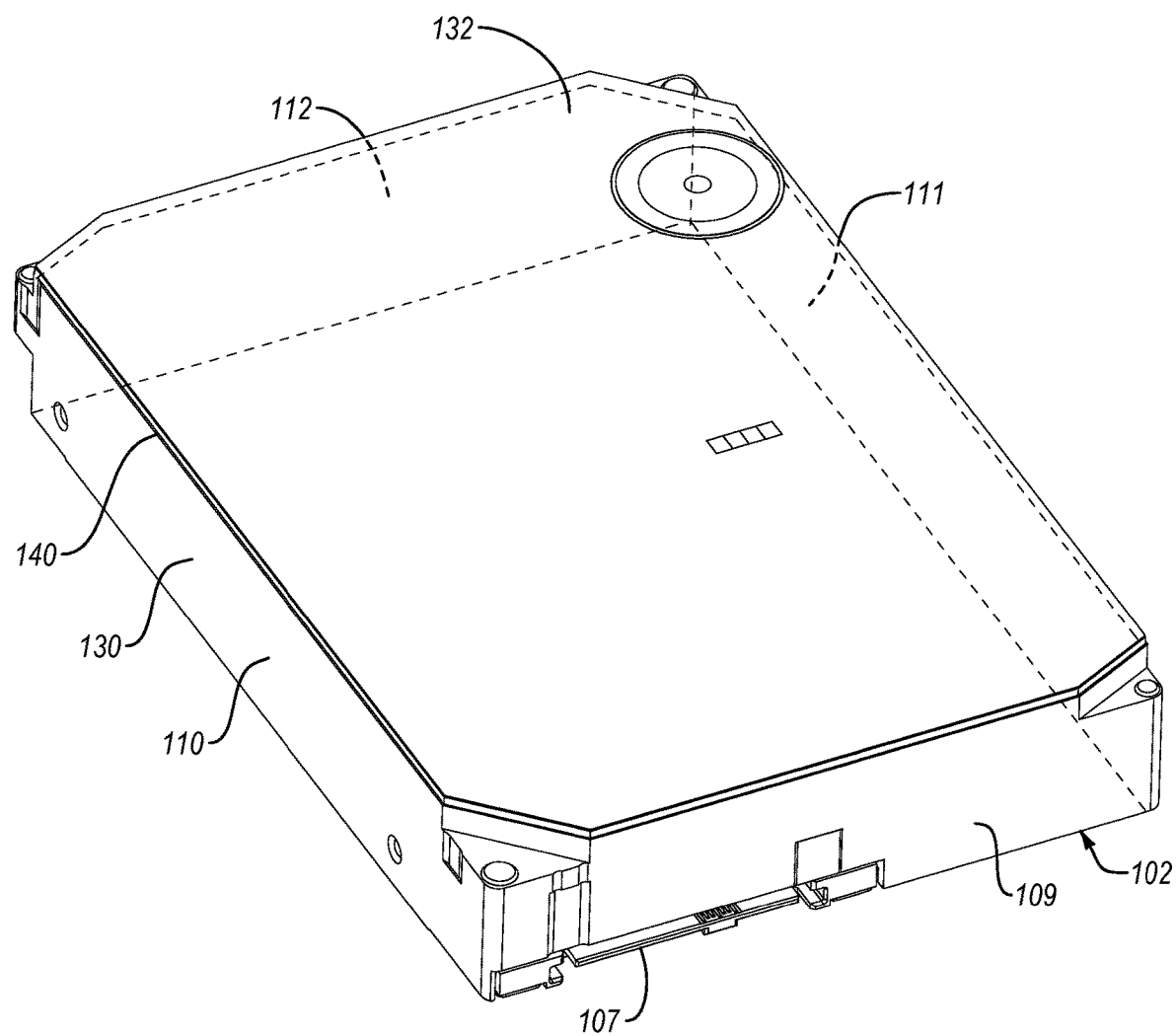
FIG. 1 is a perspective view of a magnetic storage device, according to one or more examples of the present disclosure.

Referring to FIG. 1, a magnetic storage device 100 (e.g., magnetic recording device), according to one embodiment, is depicted as a hard disk drive (HDD). However, in other embodiments, the magnetic storage device 100 can be any of various magnetic storage devices without departing from the essence of the subject matter of the present disclosure. The magnetic storage device 100 includes a housing 102 that seals or encloses an interior cavity 114 (see, e.g., FIG. 2) defined within the housing. The housing 102 includes a base 130 and a cover 132 (hidden in FIG. 2 so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a hermetic seal between the base 130 and the cover 132. In some examples, the seal between the base 130 and the cover 132 is sufficiently strong to retain, over time, the environmental conditions within the interior cavity 114 at the time the housing 102 is sealed.

Figure 2:
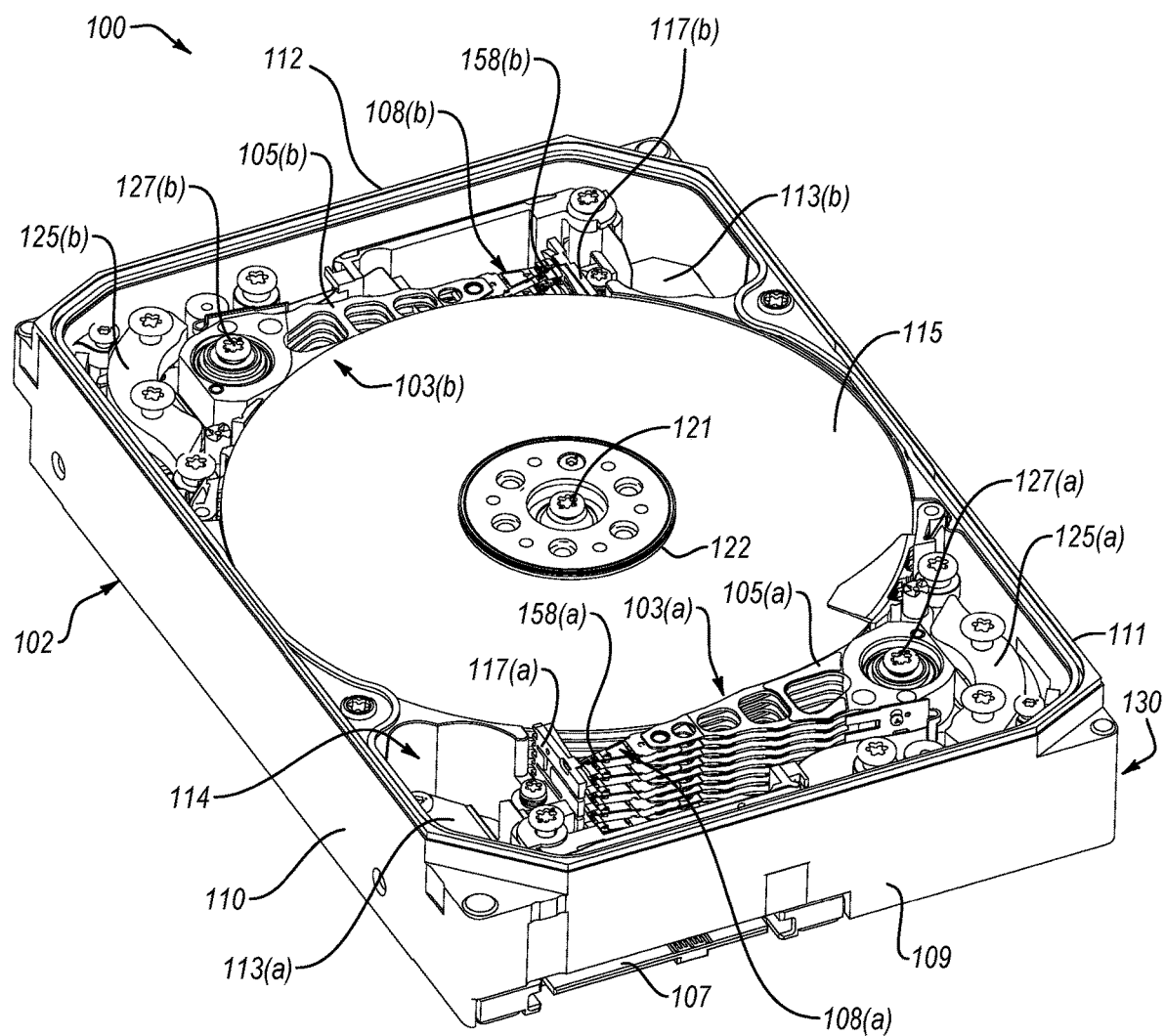
FIG. 2 is a perspective view of the magnetic storage device of FIG. 1, with a cover of a housing of the magnetic storage device hidden for convenience in showing internal features of the magnetic storage device, according to one or more examples of the present disclosure.

Referring to FIG. 2, the magnetic storage device 100 includes various features located within the interior cavity 114 of the housing 102. In some examples, the magnetic storage device 100 includes the housing 102 defining the interior cavity 114. In some embodiments, the housing 102 may conform to the small form factor (SFF) standard (see EIA/ECA-740 or SFF-8301) or have a reduced form factor. At least one magnetic disk 115 is positioned in the interior cavity 114 of the housing 102. At least one read-write head 158 is also positioned in the interior cavity 114. The read-write head 158 is configured to read data from and write data to the magnetic disk 115. The magnetic storage device 100 also includes at least one carriage arm 105 in the interior cavity 114 that is configured to position the read-write head 158 relative to the magnetic disk 115. At least one voice coil motor 125 is positioned along a first short side 109 of the housing 102 in the interior cavity 114 and is coupled to the carriage arm 105 to move the carriage arm 105 relative to the magnetic disk 115. The magnetic storage device 100 also includes an interface connector 107 recessed into a base 130 of the housing 102 opposite the voice coil motor 125(a) along the first short side 109 of the housing 102 and configured to provide electrical communication through the housing 102.

The illustrated embodiment of the magnetic storage device 100 of FIG. 2 is a dual actuator magnetic storage device 100 which includes a first actuator assembly 103(a) and a second actuator assembly 103(b). The first actuator assembly 103(a) is positioned along the first short side 109 of the housing 102 and within the interior cavity 114. The first actuator assembly 103(a) includes the first voice coil motor 125(a) positioned along the first short side 109 of the housing 102 to be proximate a first long side 110 of the housing 102. The first actuator assembly 103(a) also includes a first feedthrough connector 113(a) positioned along the first short side 109 of the housing 102 to be at an opposite end of the first short side 109 relative to the first voice coil motor 125(a).

The second actuator assembly 103(b) is positioned along a second short side 112 of the housing 102 and within the interior cavity 114. The second short side 112 of the housing 102 is opposite the first short side 109. The second actuator assembly 103(b) includes a second voice coil motor 125(b) positioned along the second short side 112 of the housing 102. The second actuator assembly 103(b) also includes a second feedthrough connector 113(b) positioned along the second short side 112 of the housing 102 to be at an opposite end of the second short side 112 relative to the second voice coil motor 125(b).

In the illustrated embodiment, the first and second carriage arms 105(a)/105(b) include corresponding head gimbal assemblies (e.g., a first head-gimbal assembly 108(a) and a second head-gimbal assembly 108(b)) each coupled to a distal tip of a corresponding one of the first carriage arm 105(a) and the second carriage arm 105(b). Each head-gimbal assembly 108 includes an associated read-write head 158.

Figure 4:
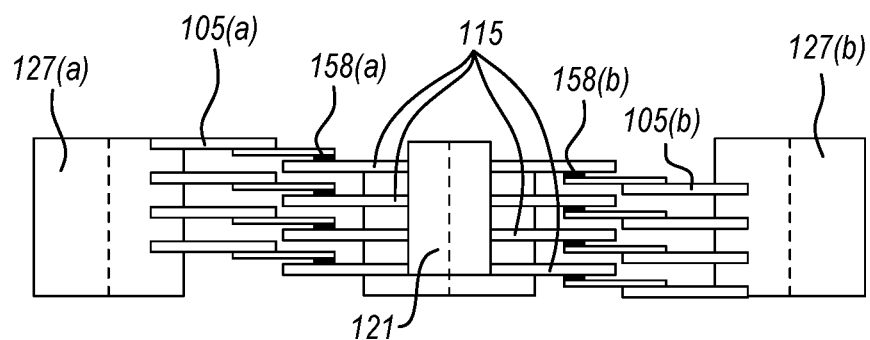
FIG. 4 is a side view of an arrangement of read-write heads, according to one or more examples of the present disclosure.

Referring to FIG. 4, one example of an arrangement of read-write heads 158 is shown. In the illustrated example, the first read-write heads 158(a) are coupled to the first carriage arms 105(a) to interface with the magnetic disks 115 in a downward facing arrangement while the second read-write heads 158(b) are coupled to the second carriage arms 105(b) in an upward facing arrangement. Separating the read-write heads 158 onto separate sets of carriage arms 105, may reduce the clearance needed to accommodate the read-write heads 158 between the magnetic disks 115 which may allow for improved overall storage capacity of the magnetic storage device 100 with more disks 115 inserted in the same disk stack height.

Figure 5:
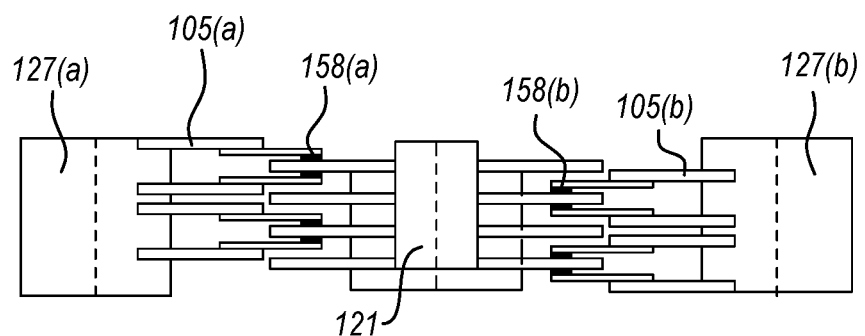
FIG. 5 is a side view of another arrangement of read-write heads, according to one or more examples of the present disclosure.

Referring to FIG. 5, one example of another arrangement of read-write heads 158 is shown. In the illustrated example, the first read-write heads 158(a) are coupled to the first carriage arms 105(a) to interface with the magnetic disks 115 in an alternating upward/downward facing arrangement while the second read-write heads 158(b) are coupled to the second carriage arms 105(b) in a similar alternating upward/downward facing arrangement. While different from the arrangement shown in FIG. 4, similarly separating the read-write heads 158 onto separate sets of carriage arms 105, may reduce the clearance needed between the magnetic disks 115 to accommodate the read-write heads 158 and include more disks 115 in the same disk stack height which allows for improved overall storage capacity of the magnetic storage device 100.

Figure 6A:
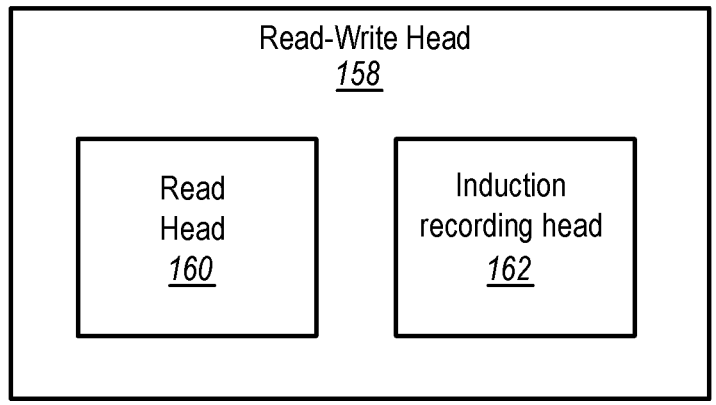
FIG. 6A is a schematic block diagram of an arrangement of a read-write head, according to one or more examples of the present disclosure.
Figure 6B:
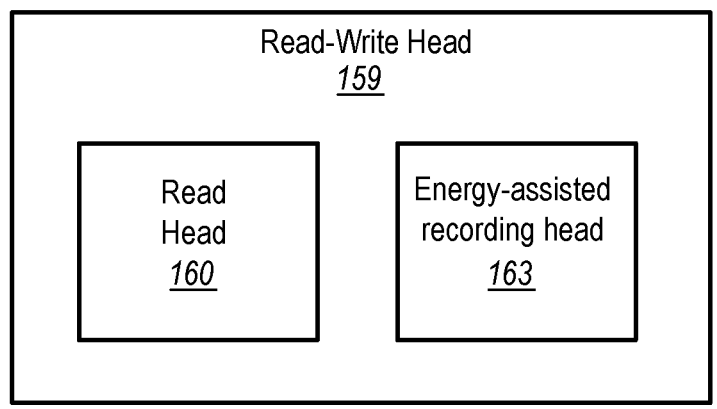
FIG. 6B is a schematic block diagram of another arrangement of a read-write head, according to one or more examples of the present disclosure.

Referring to FIG. 6A, each read-write head 158 (see e.g. first read-write head 158(a) and second read-write head 158(b)) may include a read head 160 (e.g., read portion) and an induction recording head 162. The read head 160 includes at least one read transducer and the induction recording head 162 includes at least one induction coil and a magnetic core. The read transducer is configured to detect magnetic properties (e.g., magnetic bit patterns) of a corresponding one of the disks 115 and convert the magnetic properties into an electrical signal. In contrast, the induction coil and the magnetic core alters the magnetic properties of the corresponding one of the disks 115 responsive to an electrical signal. The read-write head could also be associated with an energy-assisted recording head 163 as shown in the illustrated embodiment of FIG. 6B. For example, the energy-assisted recording head 163 may be a heat-assisted magnetic recording (HAMR) head in a read-write head 159. The HAMR write head may include at least one near-field transducer alongside an induction coil and a magnetic core. The near-field transducer provides energy assist for the induction coil and the magnetic core to alter the magnetic properties of the corresponding one of the disks 115 responsive to an electrical signal. The near-field transducer of the HAMR head is configured to temporarily heat a region of the disk 115 during writing to help facilitate altering the magnetic properties at the heated region. Heating the region of the disk 115 during writing allows the magnetic properties at the heated region to be altered with a relatively smaller magnetic field, which in turn allows writing to much smaller regions and increases the data storage capacity of the magnetic disk 115. According to some examples, the heated region is on the scale of tens of nanometers and the region is heated less than one nanosecond. In one example, the near-field transducer of the HAMR head includes a plurality of plasmonic nanostructures to deliver heat via a surface guided laser. In some embodiments, a laser diode component (not shown) to deliver heat is attached on the back side of the read-write head 159 (the opposite side to the surface facing the disks 115). Referring to FIGS. 4 and 5, the dual actuator system provides extra room at the back side of the read-write head 159 to accommodate laser diode component. Additionally, while the HAMR head example is given, the energy-assisted recording head 163 may incorporate other types of energy-assisted recording heads. For example, a microwave assisted magnetic recording (MAMR) head, or the like may be used.

Although the magnetic storage device 100 in FIG. 2 is shown to have a specific plurality of carriage arms 105 in each of the actuator assemblies 103, in other embodiments the magnetic storage device 100 can have fewer or more than the illustrated number carriage arms 105. Similarly, a specific number of magnetic disks 115 are shown but other embodiments may include fewer or more than the illustrated number of magnetic disks 115. In some embodiments, more than ten magnetic disks 115 may be arranged in magnetic storage device 100 while maintaining the SFF standard.

Additionally, the housing 102 may conform to the SFF standard. In some embodiments, the first and second long sides 110 and 111 of the housing 102 may be approximately 5.75 inches in length while the first and second short sides 109 and 112 may be approximately four inches in length. Additionally, the overall thickness of the housing 102 may be approximately one inch. In some embodiments, the magnetic disks 115 may be approximately 3.5 inches in diameter.

Referring again to FIG. 2, although the magnetic storage device 100 is shown to have one spindle motor 121, in other embodiments, the magnetic storage device 100 can have any number of spindle motors 121. The spindle motor 121 is coupled to the base 130. Generally, the spindle motor 121 includes a stationary portion non-movably fixed relative to the base 130 and a spindle 122 that is rotatable relative to the stationary portion and the base 130. Accordingly, the spindle 122 of the spindle motor 121 can be considered to be part of or integral with the spindle motor 121. Generally, the spindle motor 121 is operable to rotate the magnetic disks 115, or platters. As the spindle motor 121 rotates, the disks 115 correspondingly rotate. In this manner, the spindle motor 121 defines a rotational axis of each magnetic disk 115. The spindle motor 121 can be operatively controlled to rotate the magnetic disks 115, in a given direction, at a controlled amount and a controlled rate. Generally, the magnetic disks 115 rotate in the direction to which a given point of the disk surface under a read-write head 158 makes sliding motion toward the distal end of a head-gimbal assembly 108.

Each of the magnetic disks 115 may be any of various types of magnetic storage media. Generally, in one embodiment, each disk 115 includes a substrate and a magnetic material applied directly or indirectly onto the substrate. For example, the magnetic material of the disks 115 may be conventional granular magnetic storage disks or wafers that have magnetic layer bits with multiple magnetic grains on each bit. In granular magnetic media, all of the bits are co-planar and the surface of the disk is substantially smooth and continuous. In one embodiment, each bit has a magnetic dipole moment that can either have an in-plane (longitudinal) orientation or an out-of-plane (perpendicular) orientation.

As the disks 115 rotate in a read-write mode, the voice coil motor 125 electromagnetically engages voice coils of the carriage arms 105 to rotate the carriage arms 105, and the head-gimbal assemblies 108, which are coupled to the carriage arms 105, relative to the disks 115 in a rotational direction along a plane parallel to read-write surfaces of the disks 115. The carriage arms 105 can be rotated to position the read-write head 158 of the head-gimbal assemblies 108 over a specified radial area of the corresponding disk 115 for read and/or write operations. The voice coil motor 125 is fixed to the base 130 in engagement with the carriage arms 105, which are rotatably coupled to the base 130 via a pivot 127. Each pivot 127 (e.g. first pivot 127(a) and second pivot 127(b)) is coupled to the corresponding carriage arm 105. Generally, the pivot 127 defines a rotational axis about which the carriage arms 105 rotate when actuated by the voice coil motor 125.

In some implementations, each of the carriage arms 105 is spaced an equidistance apart from an axis of the spindle motor 121 and extend antiparallel and symmetrical relative to adjacent carriage arms 105. A respective one of the disks 115 is positioned between adjacent carriage arms 105. In an idle mode (e.g., when read-write operations are not being performed), the voice coil motor 125 is actuated to rotate the carriage arms 105, in a radially outward direction relative to the disks 115, such that the head-gimbal assemblies 108 are parked or unloaded onto a ramp support 117 secured to the base 130.

Each ramp support 117 (e.g. first ramp support 117(a) and second ramp support 117(b)) is positioned within the interior cavity 114 to receive the corresponding carriage arm 105. In some embodiments, the first ramp support 117(a) is positioned along the first short side 109 to receive and support the corresponding carriage arm 105 in a standby state in which the carriage arm 105 is positioned away from the magnetic disk 115. In the illustrated embodiment, the first carriage arm 105(a) is positioned primarily between the first pivot 127(a) and the first ramp support 117(a) in the standby state, and the first ramp support 117(a) is positioned between the first carriage arm 105(a) and the first feedthrough connector 113(a). This arrangement takes advantage of the relative size and shape of each component to facilitate a more efficient layout and improve capacity by allowing for larger diameter magnetic disks 115 than with the other arrangements to be included in the housing 102 while maintaining the SFF standard sizing for the magnetic storage device 100.

For each head-gimbal assembly 108, the electrical signals are transmitted from and to the read-write head 158 via electrical traces or lines. The electrical traces are electrically interconnected to facilitate transmission of electrical signals between the read-write head 158 and an associated feedthrough connector (e.g. first feedthrough connector 113(a) and second feedthrough connector 113(b)) of the magnetic storage device 100. The feedthrough connectors 113 (e.g. first feedthrough connector 113(a) and second feedthrough connector 113(b)) may be positioned adjacent to the at least one interface connector 107 and opposite a corresponding voice coil motor 125 (e.g. first voice coil motor 125(a) and second voice coil motor 125(b)) along the short sides 109 and 112 of the housing 102.

The feedthrough connectors 113 may facilitate communication with a control module (not shown). The control module may be configured to process the electrical signals and facilitate communication of the electrical signals between the magnetic storage device 100 and one or more external computing devices via the interface connector 107. Generally, the control module includes software, firmware, and/or hardware used to control operation of the various components of the magnetic storage device 100. The control module may include a printed circuit board on or in which the hardware is mounted.

Figure 3A:
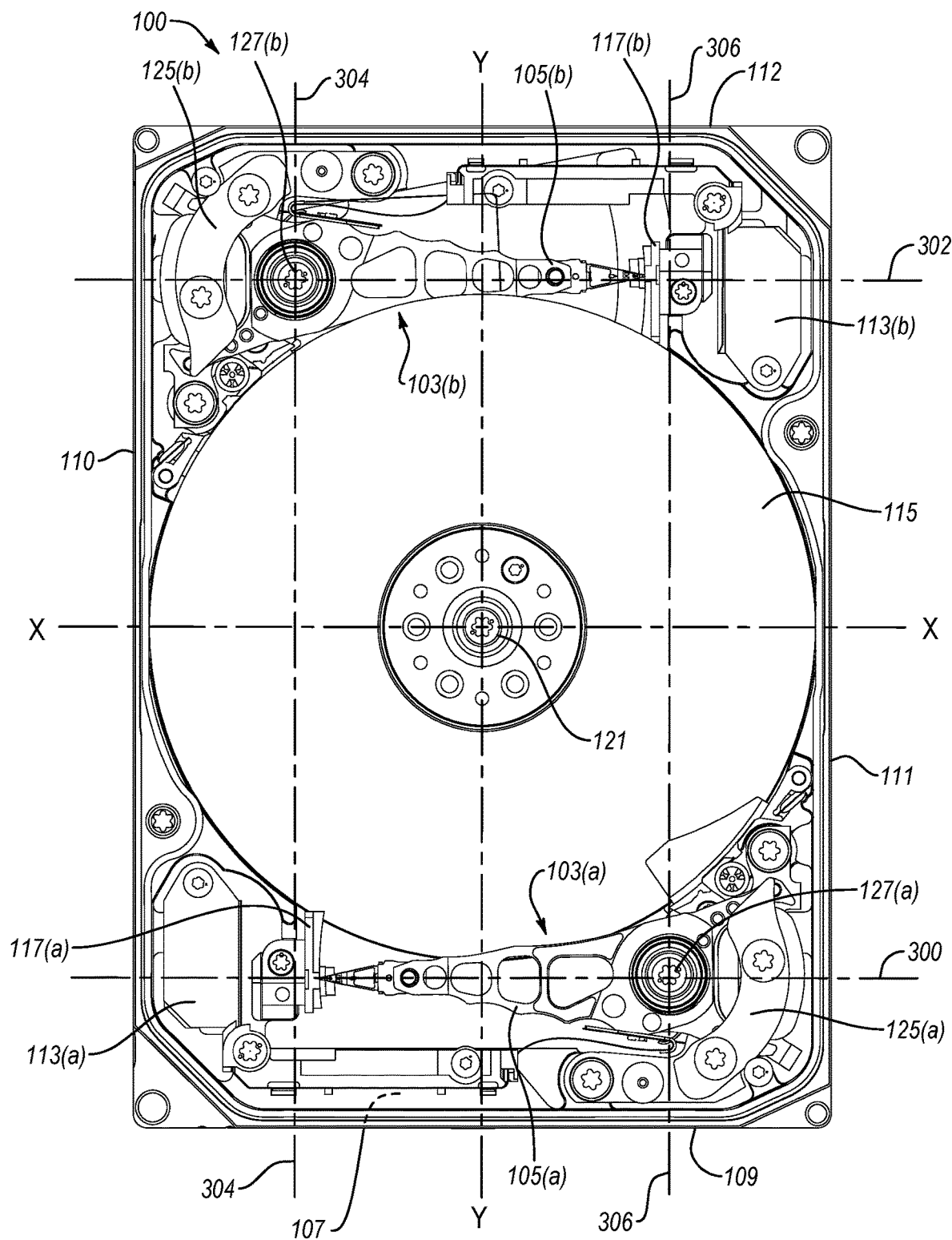
FIG. 3A is a plan view of the magnetic storage device of FIG. 2, according to one or more examples of the present disclosure.

Referring now to FIG. 3A, the relative arrangement of the first actuator assembly 103(a) and the second actuator assembly 103(b) is symmetrical relative to both an x-axis and a y-axis, as shown, with the x-axis and the y-axis both centered on the spindle motor 121 in a center of the magnetic disk 115. In other embodiments, the relative arrangement of the first actuator assembly 103(a) and the second actuator assembly 103(b) may be mirrored across the magnetic disk 115 relative to only the x-axis.

In the illustrated embodiment, each of the first feedthrough connector 113(a), the first ramp support 117(a), the first carriage arm 105(a), the first pivot 127(a) and the first voice coil motor 125(a) are aligned with one another to be along a first imaginary line 300 which is parallel to, and shown near to, the first short side 109 and perpendicular to the first long side 110 and the second long side 111.

Similarly, each of the second feedthrough connector 113(b), the second ramp support 117(b), the second carriage arm 105(b), the second pivot 127(b) and the second voice coil motor 125(b) are aligned with one another to be along a second imaginary line 302 which is parallel to, and shown near to, the second short side 112 and perpendicular to the first long side 110 and the second long side 111.

Figure 3B:
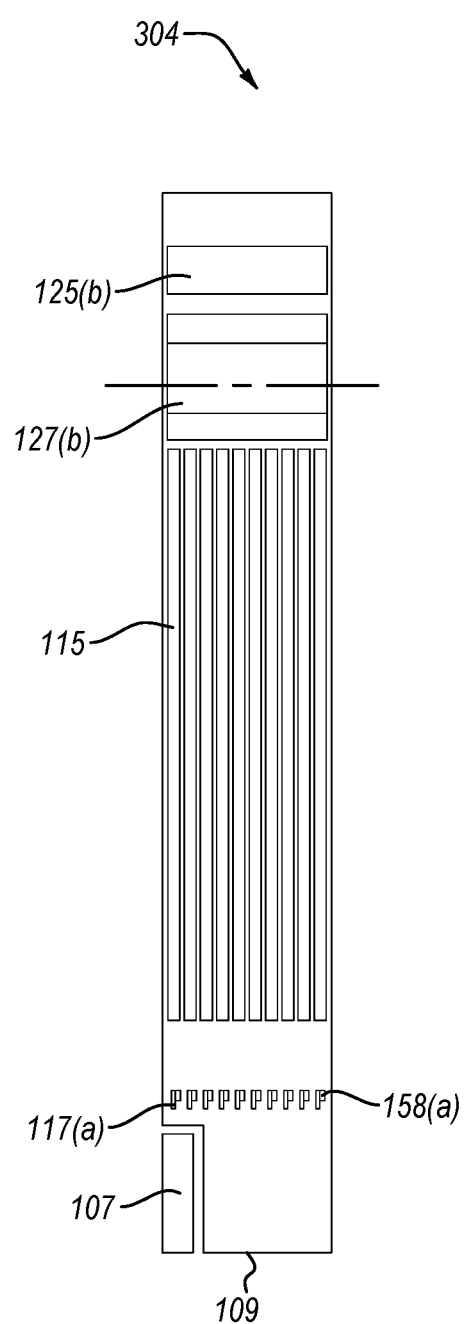
FIG. 3B is a cross-sectional view of the magnetic storage device of FIG. 3A along a first cross-section, according to one or more examples of the present disclosure.
Figure 3C:
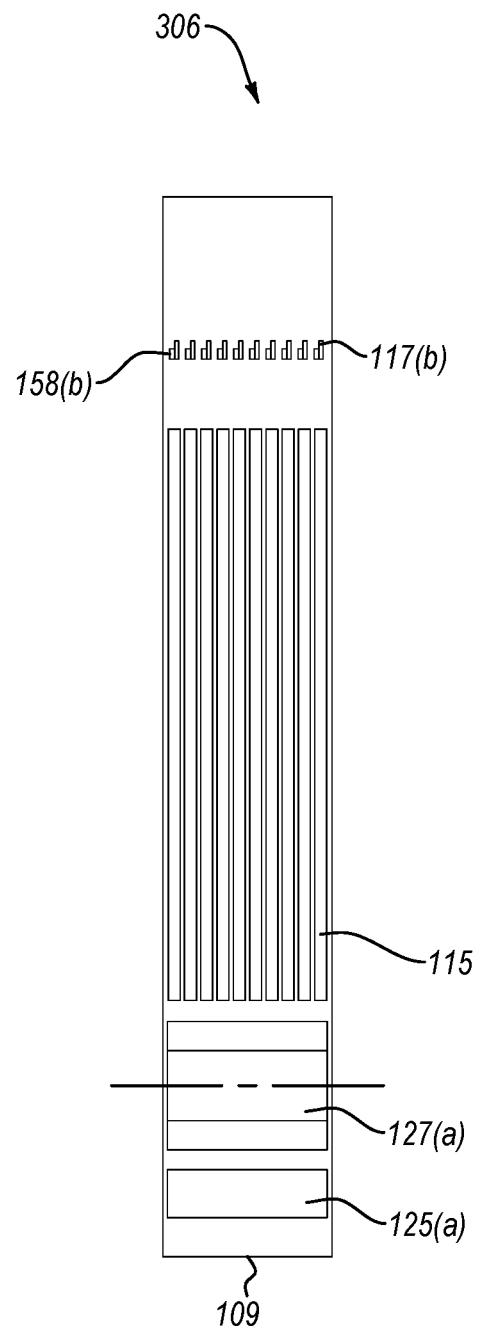
FIG. 3C is a cross-sectional view of the magnetic storage device of FIG. 3A along a second cross-section, according to one or more examples of the present disclosure.

Referring now to FIGS. 3B and 3C, the cross-sectional views along the first cross-section 304 and the second cross-section 306, the first voice coil motor 125(a) is positioned at the opposite corner from the interface connector 107 along the first short side 109. FIG. 3B shows a view from the first long side 110 while FIG. 3C shows a view from the second long side 111. Since the interface connector 107 is recessed into the base 130 of the housing 102 as illustrated in FIG. 3B along the first cross-section 304, the cross-section view being parallel to the first long side 110 and the second long side 111 of the housing 102 across the first read-write heads 158(a), the first voice coil motor 125(a) are positioned elsewhere to avoid dimensional conflict with the recessed interface connector 107 along the first cross-section 304. Thus, the first voice coil motor 125(a) is positioned at the opposite corner from the interface connector 107 along the first short side 109 as illustrated in FIG. 3C along the second cross-section 306, the cross-section view being parallel to the first long side 110 and the second long side 111 of the housing 102 across the second read-write heads 158(b).

This alignment provides for a more efficient use of space of the components within the magnetic storage device 100. In particular, this arrangement allows for a dual actuator system incorporating both the first actuator assembly 103(a) and the second actuator assembly 103(b) to provide more room for the magnetic disks 115 to allow for larger diameter disks than with the other alignments to improve storage capacity of the magnetic storage device 100 while maintaining a form factor which satisfies the SFF standard while affording adequate space for the interface connector 107 along the first short side 109 of the housing 102.

Figure 7:
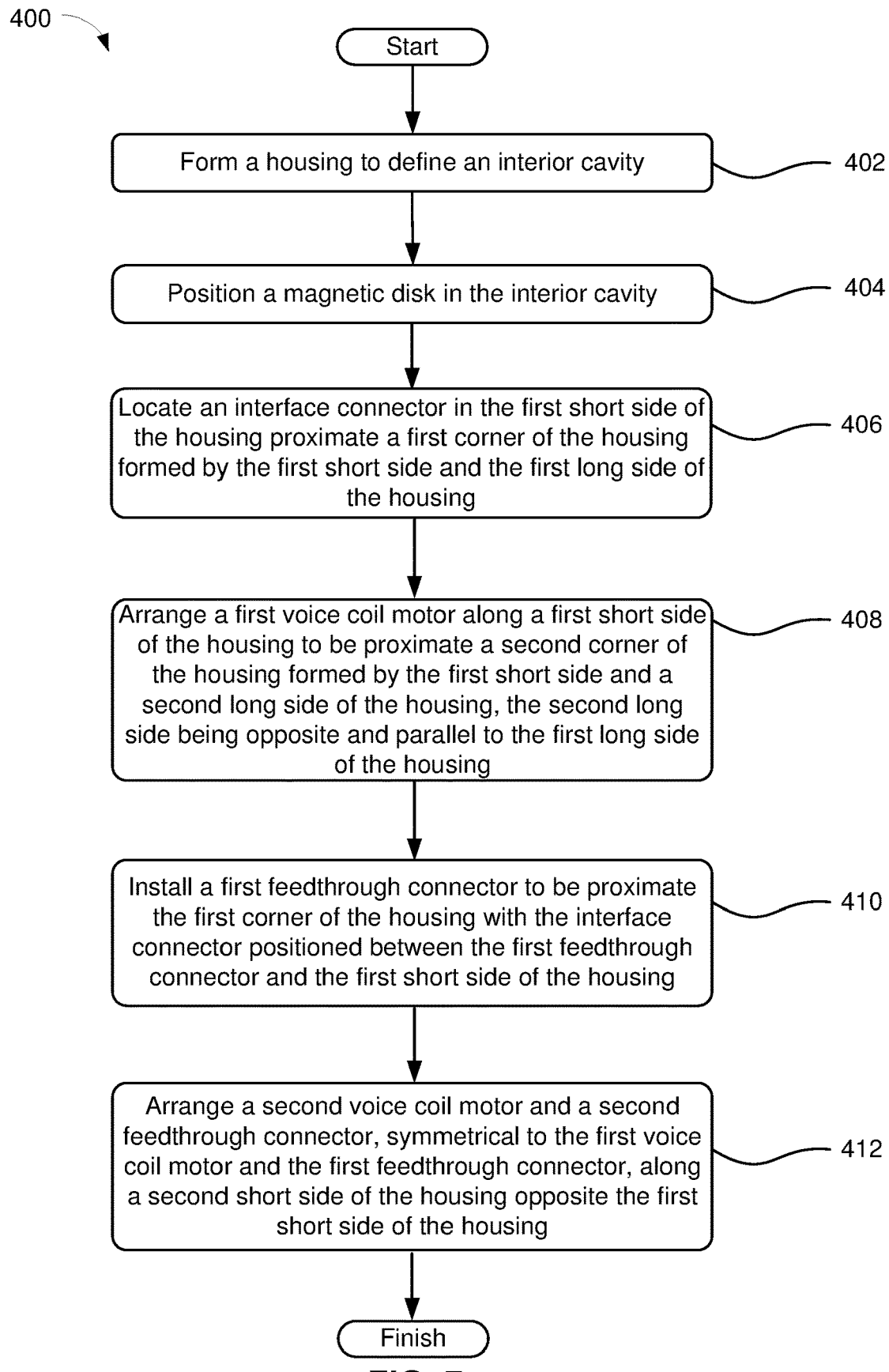
FIG. 7 is a schematic flow chart of a method of making a magnetic storage device, according to one or more examples of the present disclosure.

As shown in FIG. 7, according to one example, a method 400 of making the dual actuator magnetic storage device 100 includes forming the housing 102 to define the interior cavity 114, at 402. The method 400 also includes positioning the magnetic disk 115 in the interior cavity 114, at 404. The method 400 also includes locating the interface connector 107 in the first short side 109 of the housing 102 proximate the first corner of the housing 102 formed by the first short side 109 and a first long side 110 of the housing 102, at 406. In some embodiments, the interface connector 107 is positioned and arranged according to an interface connector standard, such as the SATA/SAS SFF interface connector standard.

The method 400 also includes arranging the first voice coil motor 125(a) along the first short side 109 of the housing 102 to be proximate a second corner of the housing 102 formed by the first short side 109 and a second long side 111 of the housing 102, the second long side being opposite the first long side 110 of the housing 102, at 408. The method 400 also includes installing the first feedthrough connector 113(a) to be proximate the first corner of the housing 102 with the interface connector 107 positioned between the first feedthrough connector 113(a) and the first short side 109 of the housing 102, at 410. The method 400 also includes arranging a second voice coil motor 125(b) and a second feedthrough connector 113(b), symmetrical to the first voice coil motor 125(a) and the first feedthrough connector 113(a), along a second short side 112 of the housing 102 opposite the first short side 109 of the housing 102, at 412.

In some implementations, locating the interface connector 107 in the first short side 109 of the housing 102 includes recessing the interface connector 107 in the first short side 109 of the housing 102, as illustrated in FIG. 3B.

In some examples, the housing is approximately rectangular, having 1 inch in thickness with the first short side 109 and the second short side 112 measuring approximately 4 inches and the first and second long sides 110 and 111 measuring 5.75 inches and the magnetic disks 115 measuring approximately 3.5 inches in diameter.

In some examples, the method 400 includes aligning the first voice coil motor 125(a) and the first feedthrough connector 113(a) along a first imaginary line 300 drawn perpendicular to the first long side 110 and the second long side 111 and parallel and proximate to the first short side 109 of the housing and aligning the second voice coil motor 125(b) and the second feedthrough connector 113(b) along a second imaginary line 302 drawn perpendicular to the first long side 110 and the second long side 111 and parallel and proximate to the second short side 112 of the housing.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A dual actuator magnetic storage device, comprising:
   a housing defining an interior cavity;
   magnetic disks in the interior cavity of the housing;
   an interface connector located on a first short side of the housing proximate a first corner of the housing formed by the first short side and a first long side of the housing, the first long side of the housing being perpendicular to the first short side of the housing;
   a first voice coil motor in the interior cavity and positioned proximate a second corner of the housing formed by the first short side and a second long side of the housing, the second long side of the housing being opposite and parallel to the first long side of the housing;
   a first carriage arm in the interior cavity and positioned near the first short side of the housing, being coupled to the first voice coil motor to move the first carriage arm relative to the magnetic disks, and configured to position a first read-write head relative to the magnetic disks, wherein the read-write head is configured to read data from, and write data to, the magnetic disks;
   a second voice coil motor in the interior cavity and positioned proximate a second short side of the housing and along the first long side of the housing, the second short side of the housing being opposite and parallel to the first short side of the housing;
   a second carriage arm in the interior cavity and positioned near the second short side of the housing opposite and parallel to the first short side of the housing, being coupled to the second voice coil motor to move the second carriage arm relative to the magnetic disks, the second carriage arm configured to position a second read-write head relative to the magnetic disks to read data from, and write data to, the magnetic disks;
   the interface connector is recessed into a base of the housing along the first short side of the housing to be near the first long side of the housing, wherein the interface connector is configured to provide electrical communication through the housing;
   a first feedthrough connector in the interior cavity positioned adjacent to the interface connector along the first long side of the housing;
   a second feedthrough connector in the interior cavity positioned along the second long side of the housing and proximate the second short side of the housing;
   a first pivot coupled to the first carriage arm and defining a first rotational axis about which the first carriage arm rotates;
   a first ramp support in the interior cavity and configured to receive the first carriage arm;
   a second pivot coupled to the second carriage arm and defining a second rotational axis about which the second carriage arm rotates; and
   a second ramp support in the interior cavity and configured to receive the second carriage arm;
   wherein the first voice coil motor, the first pivot, the first carriage arm, the first ramp support, and the first feedthrough connector are arranged in order along an imaginary line drawn perpendicular to the first long side and the second long side and parallel to the first short side and the second short side of the housing.

2. The dual actuator magnetic storage device according to claim 1, wherein the housing has an overall thickness of approximately one inch.

3. The dual actuator magnetic storage device according to claim 2, wherein the first long side and the second long side of the housing each have a length of approximately 5.75 inches and the first short side of the housing has a length of approximately 4 inches.

4. The dual actuator magnetic storage device according to claim 1, wherein the magnetic disks have a diameter of between approximately 3.5 inches (88.9 mm) and approximately 4 inches (101.6 mm).

5. The dual actuator magnetic storage device according to claim 1, wherein the magnetic disks comprise equal to or more than ten magnetic disks.

6. The dual actuator magnetic storage device according to claim 1, wherein one of the first read-write head and the second read-write head is oriented in a downward facing arrangement relative to a corresponding one of the magnetic disks and the other of first read-write head and the second read-write head is oriented in an upward facing arrangement relative to the corresponding one of the magnetic disks, wherein the downward facing arrangement and the upward facing arrangement orient the read-write heads in opposite directions relative to one another.

7. The dual actuator magnetic storage device according to claim 1, wherein at least one of the first read-write head has a downward facing arrangement and another at least one of the first read-write head has an upward facing arrangement, wherein the downward facing arrangement and the upward facing arrangement orient the read-write heads in opposite directions relative to one another.

8. The dual actuator magnetic storage device according to claim 7, wherein the first carriage arm comprises only one first read-write head.

9. The dual actuator magnetic storage device according to claim 1, wherein at least one of the first read-write head and the second read-write head comprises an energy-assisted magnetic recording head.

10. The dual actuator magnetic storage device according to claim 1, wherein the second voice coil motor, the second pivot, the second carriage arm, the second ramp support, and the second feedthrough connector are arranged in order along a second imaginary line drawn perpendicular to the first long side and the second long side and parallel to the first short side and the second short side of the housing.

11. A dual actuator magnetic storage device comprising:
a housing defining an interior cavity;
a magnetic disk in the interior cavity of the housing;
a first actuator assembly positioned along a first short side of the housing and within the interior cavity to move relative to the magnetic disk, the first actuator assembly comprising:
a first feedthrough connector positioned along the first short side of the housing to be proximate a first long side of the housing, the first long side being perpendicular to the first short side and forming a first corner in the housing; and
a first voice coil motor electrically coupled to the first feedthrough connector and positioned along the first short side of the housing to be proximate a second long side of the housing parallel to and opposite the first long side of the housing and forming a second corner in the housing; and
a second actuator assembly positioned along a second short side of the housing and within the interior cavity to move relative to the magnetic disk, wherein the second short side of the housing is opposite the first short side, the second actuator assembly comprising:
a second feedthrough connector positioned proximate the second short side of the housing and along the second long side of the housing; and
a second voice coil motor electrically coupled to the second feedthrough connector and positioned proximate the second short side of the housing and along the first long side of the housing;
wherein the first actuator assembly further comprises:
a first pivot coupled to the first voice coil motor, wherein the first voice coil motor is positioned along the first short side to be between the first pivot and the second long side of the housing;
a first carriage arm coupled to and extending from the first pivot with the first pivot defining a rotational axis about which the first carriage arm rotates; and
a first ramp support positioned along the first short side to receive and support the first carriage arm in a standby state, wherein the first carriage arm is positioned primarily between the first pivot and the first ramp support in the standby state, and the first ramp support is positioned between the first carriage arm and the first feedthrough connector.

12. The dual actuator magnetic storage device according to claim 11, further comprising an interface connector coupled to the housing on the first short side of the housing proximate the first long side of the housing.

13. The dual actuator magnetic storage device according to claim 11, wherein the first actuator assembly and the second actuator assembly are positioned opposite one another within the housing, with the magnetic disk positioned between the first actuator assembly and the second actuator assembly to have a symmetrical arrangement relative to the magnetic disk.

14. The dual actuator magnetic storage device according to claim 11, wherein the second actuator assembly further comprises:
a second pivot coupled to the second voice coil motor, wherein the second voice coil motor is positioned along the second short side to be between the second pivot and the first long side of the housing;
a second carriage arm coupled to and extending from the second pivot with the second pivot defining a rotational axis about which the second carriage arm rotates; and
a second ramp support positioned along the second short side to receive and support the second carriage arm in a standby state, wherein the second carriage arm is positioned primarily between the second pivot and the second ramp support in the standby state, and the second ramp support is positioned between the second carriage arm and the second feedthrough connector.

15. The dual actuator magnetic storage device according to claim 14, wherein:
the first voice coil motor, the first pivot, the first carriage arm, the first ramp support, and the first feedthrough connector are arranged in order along an imaginary line drawn perpendicular to the first long side and the second long side and parallel to the first short side and the second short side of the housing; and
the second voice coil motor, the second pivot, the second carriage arm, the second ramp support, and the second feedthrough connector are arranged in order along a second imaginary line drawn perpendicular to the first long side and the second long side and parallel to the first short side and the second short side of the housing.

16. The dual actuator magnetic storage device according to claim 11, wherein the first voice coil motor, the first pivot, the first carriage arm, the first ramp support, and the first feedthrough connector are arranged in order along an imaginary line drawn perpendicular to the first long side and the second long side and parallel to the first short side and the second short side of the housing.

17. A method of making a dual actuator magnetic storage device, the method comprising:
forming a housing to define an interior cavity;
positioning a magnetic disk in the interior cavity;
locating an interface connector in a first short side of the housing proximate a first corner of the housing formed by the first short side of the housing and a first long side of the housing;
arranging a first voice coil motor along the first short side of the housing to be proximate a second corner of the housing formed by the first short side and a second long side of the housing, the second long side being opposite and parallel to the first long side of the housing;
installing a first feedthrough connector to be proximate the first corner of the housing with the interface connector positioned between the first feedthrough connector and the first short side of the housing;

arranging a second voice coil motor and a second feedthrough connector, symmetrical to the first voice coil motor and the first feedthrough connector, along a second short side of the housing opposite the first short side of the housing; and aligning the first voice coil motor, a first carriage arm of the dual actuator magnetic storage device, a first pivot of the first carriage arm, a first ramp support configured to receive the first carriage arm, and the first feedthrough connector along an imaginary line drawn perpendicular to the first long side and the second long side and parallel and proximate to the first short side of the housing.

18. The method of making the dual actuator magnetic storage device according the claim 17, wherein locating the interface connector in the first short side of the housing comprises recessing the interface connector in the first short side of the housing.

19. The method of making the dual actuator magnetic storage device according the claim 17, wherein the housing is approximately rectangular having 1 inch in overall thickness with the first short side and second short side each measuring approximately 4 inches, the first long side and second long side each measuring 5.75 inches, and the magnetic disk measuring between approximately 3.5 inches (88.9 mm) and approximately 4 inches (101.6 mm).

20. The method of making the dual actuator magnetic storage device according the claim 17, further comprising:

aligning the second voice coil motor a second carriage arm of the dual actuator magnetic storage device, a second pivot of the second carriage arm, a second ramp support configured to receive the second carriage arm, and the second feedthrough connector along a second imaginary line drawn perpendicular to the first long side and the second long side and parallel and proximate to the second short side of the housing.

* * * * *